G. HONOLD.
ELECTROMAGNETIC IGNITER FOR EXPLOSION ENGINES.
APPLICATION FILED AUG. 7, 1906.

931,066.

Patented Aug. 17, 1909.

WITNESSES
M. Taylor.
R. M. Elliott

INVENTOR
Gottlob Honold
by George Massie
ATTORNEYS

UNITED STATES PATENT OFFICE.

GOTTLOB HONOLD, OF STUTTGART, GERMANY.

ELECTROMAGNETIC IGNITER FOR EXPLOSION-ENGINES.

No. 931,066.  Specification of Letters Patent.  Patented Aug. 17, 1909.

Application filed August 7, 1906. Serial No. 329,568.

*To all whom it may concern:*

Be it known that I, GOTTLOB HONOLD, engineer, a subject of the German Empire, residing at 11 Hoppenlaustrasse, Stuttgart, Germany, have invented certain new and useful Improvements in Electromagnetic Igniters for Explosion-Engines; and I do hereby declare the following to be a full, clear, and exact description of the invention, such as will enable others skilled in the art to which it appertains to make and use the same.

My invention relates to improvements in electromagnetic make and break sparkers such as are used for internal combustion engines.

The object of my invention is to provide a construction which is durable and certain in operation, thereby avoiding the chief disadvantages which have been urged against this class of sparkers.

A particular object of my invention is to provide a construction in which the spring which tends to hold the movable electrode in contact with the fixed electrode is protected against deterioration by the heat of the explosive gases.

My invention will first be described in connection with the accompanying drawings and then particularly pointed out in the claims.

Figure 1:
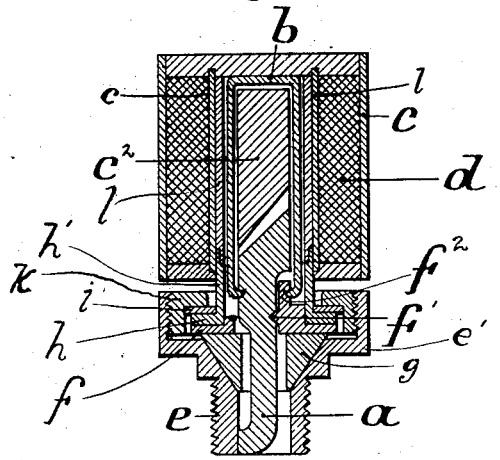
Figure 2:
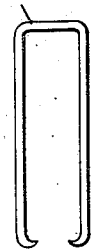
Figure 3:
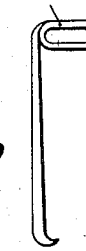
Figure 4:
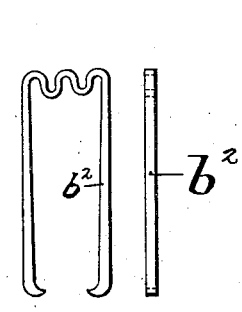

In the drawings Figure 1 is a longitudinal section of an igniter constructed in accordance with my invention; Fig. 2 shows a spring employed by me, in two views at right angles to each other; and Figs. 3 and 4 are views of modified forms of springs which may be employed in connection with my invention.

Referring to the drawings, $e$, Fig. 1, is an igniter bushing arranged to be screwed into the wall of the cylinder. This bushing is expanded in diameter at its outer end to form a socket, as indicated at $e'$, which socket is internally screw-threaded.

The bushing $e$ has one portion of its interior coned to receive a conical plug $g$, which fits tightly into its seat in the coned portion of the bushing in order to make a gas-tight joint. Upon this conical plug is placed a bearing ring having a flange $f$, from which projects a lug carrying a knife-edge bearing $f'$, the outer face of the lug having a notch, as indicated at $f^2$ to receive the hooked end of a spring as more fully explained hereinafter.

Upon the flange $f$ of the bearing ring rests the flange $h$ of a tubular casing $h'$, and upon this latter flange $h$ rests an annulus $i$. The annulus $i$ is pressed tightly against the flange $h$ by a thimble $k$ threaded into the socket $e'$, whereby the parts are held firmly together.

At $l$ is shown an extension of the tubular casing $h'$ the part $l$ being secured to the part $h'$ in any suitable way, as for example, by rabbeting the ends together as shown in the drawings. The extension $l$ is of magnetic material, and over it is fitted an iron clad electro-magnet whose windings are indicated at $d$, the inner and outer shells of iron being indicated at $c$ and $c'$ respectively.

Within the extension $l$ is secured a core $c^2$ of magnetic material having an inclined operative face, said core being slotted at the outer end and along two opposite sides, in order to receive a spring $b$ having two arms connected by a yoke, the latter especially being relied upon for its resiliency, as will be more fully explained hereinafter. The spring $b$ has its ends inturned to form hooks, as will be clear from the drawings.

At $a$ is shown a lever whose lower end projects axially into the bushing $e$ and is turned radially outward to form a movable electrode which contacts with the inner wall of the bushing, said bushing forming the fixed electrode. The lever $a$ has a notch into which enters the knife edge bearing $f'$ and a notch to receive one end of the spring $b$ whose other end enters the notch indicated at $f^2$ in the lug. The lever $a$ also has an inclined end arranged to face the inclined end of the core $c^2$, this end of the lever $a$ serving as the armature of the device.

Assuming that the electro-magnet windings are included in an electric circuit and the two electrodes, also, the operation will be as follows: When the magnet is energized the core $c^2$ will attract the inclined end of the lever $a$ and the latter will swing upon its fulcrum, thus swinging the movable electrode away from the fixed electrode and producing the ignition spark. At the same time, the end of the spring $b$ in engagement with the lever $a$ is forced in a direction radially outward from the axis of the device, thus putting the spring under greater tension than it has initially. As soon as the magnet is demagnetized the spring will return the lever $a$ to its normal position where the electrodes are in contact with each other.

It is to be observed that the effective resilient part of the spring $b$, namely, the yoke, is placed as far from the electrodes as possible, so that although the space in which the spring is located is in communication with the explosion chamber, the gases are materially cooled before reaching the said yoke. Furthermore, as the core $c^2$ is between the yoke of the spring and the electrodes the yoke is protected from the direct blast of the gases. By this arrangement, although the entire active mechanism is practically in the path of the explosive gases, the spring does not lose its resiliency. Furthermore, by the employment of the knife-edge bearing all difficulties due to deposit of carbon on the bearings are avoided, the rocking of the lever $a$ on the knife edge $f'$ being sufficient to cut the carbon loose as rapidly as deposited, and while, therefore, it is a mere film. In this way the amount of energy necessary to operate the lever $a$ is materially reduced. Moreover, by the arrangement described, there are no packing devices around moving parts and consequently the dangers of leakage of the gases are avoided.

In Figs. 3 and 4 I have illustrated modified forms of spring $b'$, $b^2$ respectively, which may be employed by me. In these constructions, the resiliency of the springs is increased by increasing the length of the yoke, for example, by a simple elliptical coil as shown in Fig. 3 or by corrugating the yoke as shown in Fig. 4.

Having thus fully described my invention, what I claim as new, is:—

1. In an electromagnetic igniter, the combination, with an electro-magnet, of a core located within the same, a lever having one end constituting an armature whose longitudinal axis is arranged in the general direction of the axis of the core, said lever being fulcrumed intermediate its ends, one end of said lever being arranged as a movable electrode, the armature end being arranged to coact with the core, a bushing into which the movable electrode extends and with which it contacts, and means tending to hold the movable electrode in contact with the bushing.

2. In an electromagnetic igniter, the combination, with a tubular electro-magnet, of a core located within the same and having an inclined operative face, a lever having one end constituting an armature whose longitudinal axis is arranged in the general direction of the axis of the core, said lever being fulcrumed intermediate its ends, one end of said lever being arranged as a movable electrode and the armature end having an inclined face to coact with the inclined operative face of the core, a bushing into which the movable electrode extends and with which it contacts, and yielding means tending to hold the lever in contact with the bushing.

3. In an electromagnetic igniter, the combination, with an electro-magnet, of a core located within the same, a lever having its longitudinal axis arranged in the general direction of the axis of the core, one end of said lever being arranged as a movable electrode and the other end arranged as an armature to coact with the core, a knife edge fulcrum which engages the lever intermediate its ends, a fixed electrode, and yielding means for keeping the movable electrode normally in contact with the fixed electrode.

4. In an igniter, the combination, with an electro-magnet, and a bushing, of a lever arranged with its longitudinal axis in the direction of the axis of the bushing, said lever having one end arranged to contact with the bushing, a knife-edge fulcrum engaging the lever intermediate its ends, means for moving the lever in one direction, and a U-shaped spring arranged within the coil of the electromagnet and secured at one end and having its other end engaging the lever at one side of the knife edge fulcrum.

5. In an electromagnetic igniter, the combination, with an electro-magnet and a core within said magnet and having a groove across one end, of a lever having one end arranged as a movable electrode and the other end arranged as an armature to coact with said core, a fixed electrode coacting with the movable electrode, and a spring having its effective resilient portion located in the groove in the core, said spring being arranged to keep the electrodes in contact.

6. In electromagnetic igniters for explosion engines the combination with an electro-magnet, of a contact lever one arm of which normally contacts with the body of the igniter and the other arm of which carries the armature for the electro-magnet, and a U-shaped spring inside the coil of the electromagnet and disposed in such a manner as to place the active part or yoke of the U at a point removed as far as possible from the explosion chamber.

7. In electromagnetic igniters for explosion engines, the combination, with an electro-magnet, of a contact lever carrying the armature for the electro-magnet, and a U-shaped spring disposed so as to place the active or yoke part of the U at a point farthest removed from the explosion chamber and in a channel shaped behind a part of the stationary iron core of the electromagnet.

8. In electromagnetic igniters for explosion engines, the combination, with an electro-magnet, of a lever one arm of which normally contacts with the body of the igniting device and the other arm of which carries the armature of the electro-magnet, and a U-shaped spring the active part of which is formed with elongating curved portions and placed at a point farthest removed from the explosion chamber and behind a part of the stationary iron core of the electromagnet.

In testimony whereof I have hereunto affixed my signature in the presence of two witnesses.

GOTTLOB HONOLD.

Witnesses:
RUDOLF KLEIN,
ERNST ENTENMANN.